W. A. BUTLER.
Stench-Traps.
No. 151,087.
Patented May 19, 1874.
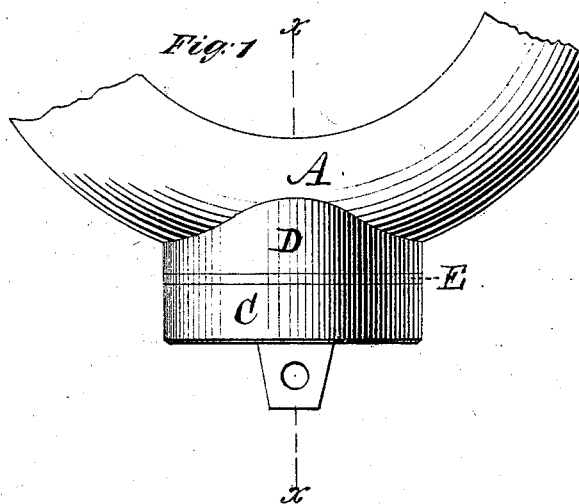
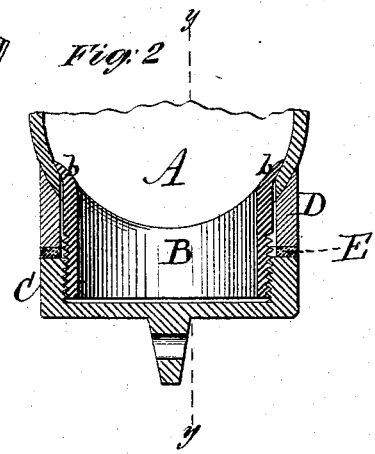
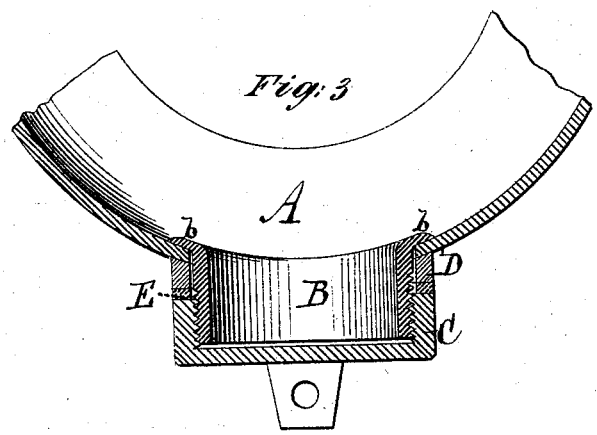
Witnesses:
Michael Ryan
Fred Haynes
Wm. A. Butler
by his Attorneys
Brown & Allen

UNITED STATES PATENT OFFICE.

WILLIAM A. BUTLER, OF NEW YORK, N. Y.

IMPROVEMENT IN STENCH-TRAPS.

Specification forming part of Letters Patent No. 151,087, dated May 19, 1874; application filed February 7, 1874.

*To all whom it may concern:*

Be it known that I, WILLIAM A. BUTLER, of New York, in the county and State of New York, have invented certain Improvements in Trap-Screws, of which the following is a specification:

My invention relates to certain improvements in screws attached to the traps of water-closets, sewers, &c., for the purpose of affording access to them when they become obstructed. The invention consists in a socket formed with a flange on its inner or upper end, corresponding with the inner curvature of the trap, and having a male screw-thread cut on its lower portion, and the combination of said socket with a collar having its upper edge corresponding with the outer curvature of the trap, and a cap or nut fitting on the threaded portion of the socket, said flange and collar serving to hold the screw in place by surrounding the opening made in the trap for the reception and clamping the edges of said opening between them.

In the accompanying drawing, Figure 1 is a side view of a trap with my improvement attached. Fig. 2 is a transverse section taken in the line $x\,x$ of Fig. 1. Fig. 3 is a longitudinal section taken in the line $y\,y$ of Fig. 2.

A represents the lower portion of a trap formed in a waste-pipe by bending the pipe in the usual manner. In the bottom of the trap is an opening for the reception of the screw. B is a socket, corresponding in form and dimensions with the opening in the bottom of the trap. On the upper or inner edge of this socket is a flange, $b$, turned outward so as to overhang the edge of the opening, the curve of said flange and the upper portion of the socket corresponding with the inner curvature of the trap, so as to fit closely around the edge of the opening. On the lower portion of the socket is a male screw-thread for engagement with a cap, C, having a corresponding female screw-thread cut in it, and provided with a projection for turning it by hand or by means of a suitable tool. D is a collar, which fits loosely around the socket B on the outside of the trap. Its lower side or edge presents a plane surface, corresponding with the edge of the screw-cap C, and its upper edge is curved to correspond with the outer curvature of the trap, so as to fit closely up against it.

The parts are placed and held in position by dropping the socket B through the opening in the trap until the flange $b$ rests upon and around the edge of said opening. The collar D is then put in place and the cap C screwed on with a leather washer or gasket, E, between the cap and the collar, thus clamping the edge of the opening between the flange $b$ and the collar D.

In most instances the cap may be screwed tight enough to cause the collar to sink into the soft metal of the trap sufficiently to hold the collar in place when the cap is removed.

What I claim as new, and desire to secure by Letters Patent, is—

The described combination, in a trap for sewers, of the flanged screw-socket B, loose collar D, and closed screw-cap C, all constructed and applied in the manner and for the purpose herein shown and specified.

WM. A. BUTLER.

Witnesses:
MICHAEL RYAN,
BENJAMIN W. HOFFMAN.